(No Model.)  2 Sheets—Sheet 1.
O. B. SHALLENBERGER.
ELECTRICAL MEASURING INSTRUMENT.
No. 591,241.  Patented Oct. 5, 1897.
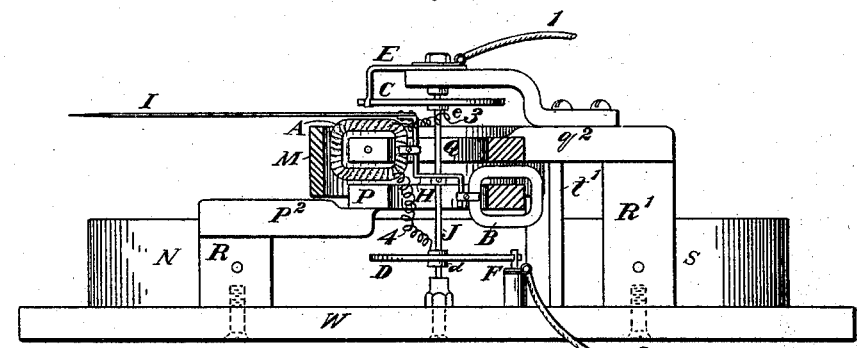
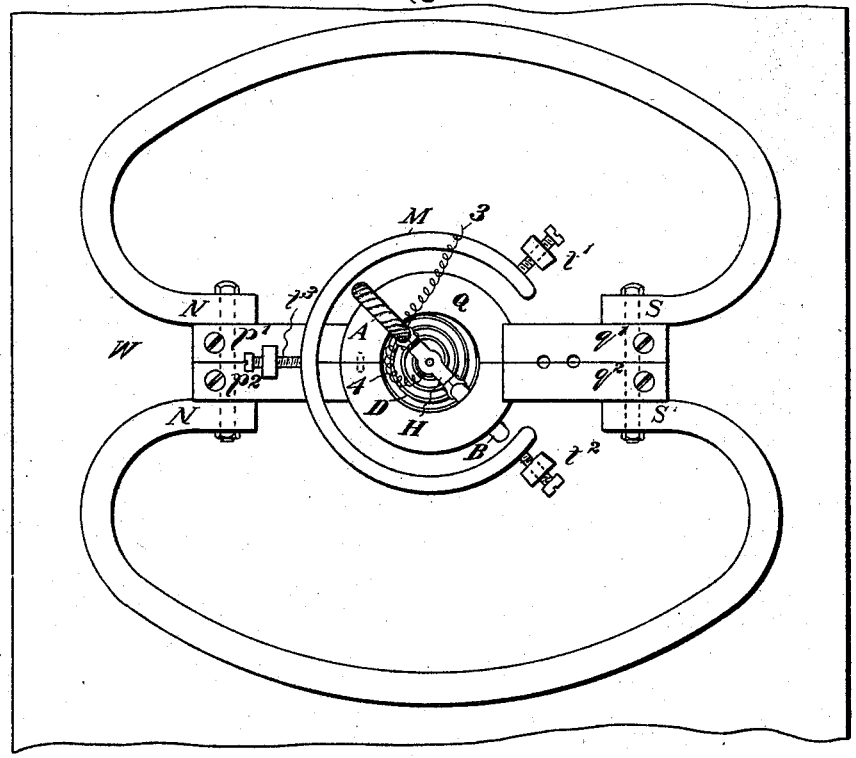
WITNESSES:
Ethan F. Dodds
Hubert C. Tener
INVENTOR
Oliver B. Shallenberger
BY
Wesley G. Carr
Associate ATTORNEY.

UNITED STATES PATENT OFFICE.

OLIVER B. SHALLENBERGER, OF ROCHESTER, PENNSYLVANIA.

ELECTRICAL MEASURING INSTRUMENT.

SPECIFICATION forming part of Letters Patent No. 591,241, dated October 5, 1897.

Application filed January 26, 1897. Serial No. 620,771. (No model.)

*To all whom it may concern:*

Be it known that I, OLIVER B. SHALLENBERGER, a citizen of the United States, residing at Rochester, in the county of Beaver and State of Pennsylvania, have invented a new and useful Improvement in Electrical Measuring Instruments, (Case No. 730,) of which the following is a specification.

My invention relates more particularly to the measurement of continuous electrical currents; and it has for its object the provision of an instrument to be used for this purpose which shall have a large angular deflection and a uniform scale, which shall be as nearly as possible "dead-beat," the moving parts of which shall be light, and which shall be simple in construction and not liable to get out of order.

Figure 3:
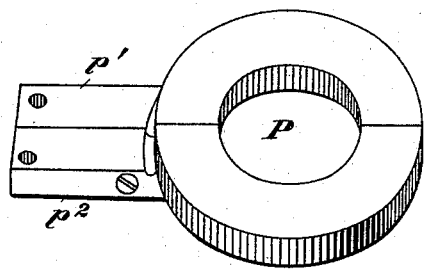
Figure 4:
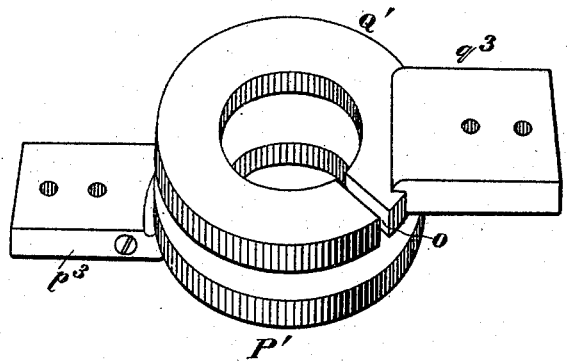

In the accompanying drawings, which are illustrative of my invention, Figure 1 is a side elevation, partly in section, of a form of measuring instrument which I have found to be suitable for practical use. Fig. 2 is a plan view of the same with some of the parts omitted. Fig. 3 is a detail perspective view of one of the pole-pieces, and Fig. 4 is a detail perspective view of a pair of pole-pieces of modified construction.

In the drawings, N S and N' S' are permanent magnets, having their poles rigidly secured to each other through the interposed blocks of magnetic material R and R'. The blocks R and R' are rigidly secured to a suitable bed-plate W, of non-magnetic material. The block R, which forms a pole-piece to the magnet-poles N and N', has rigidly secured to it a polar extension P' P², of magnetic material. The construction of this polar extension is best shown in Fig. 3, and it consists, as will be seen, of two straight bars each terminating in a semicircular piece and so arranged that when the two pieces are put together they form in effect a single bar terminating in a complete ring, (marked P in Fig. 1.) In like manner the block R', which forms the pole-piece of the magnet-poles S and S', is provided with a polar extension constructed of two pieces $q'$ $q^2$ and terminating in a complete ring, (marked Q in Figs. 1 and 2.)

The parts are so arranged, as shown in Figs. 1 and 2, that the two ring-poles confront each other with their planes parallel to each other, leaving between them a narrow annular air-gap. The lines of force in this air-gap are substantially normal to the confronting surfaces of the rings, and the construction and arrangement of the parts are such as to produce a highly-concentrated and uniformly-distributed field.

In order to shield the annular pole-pieces from stray lines of force and to provide a means for finally adjusting the field distribution, a shield-ring M, of magnetic material, is mounted so as almost completely to surround the two annular pole-pieces. It is cut away, as shown in Fig. 2, and is separated at other points from the magnet sufficiently, so as not to short-circuit the magnetic field to a harmful extent. It is supported in position by the three adjusting-screws $t'$, $t^2$, and $t^3$, by means of which its position with reference to the pole-pieces may be varied. By varying its position with reference to the pole-pieces any lack of uniformity in the distribution of the lines of force between the pole-pieces P and Q may be corrected.

A is a coil of wire surrounding or threaded upon the ring-pole Q, as shown in Fig. 1, and free to move circumferentially upon it. It is mounted upon a light shell of aluminium or other suitable material which is attached by lugs to a metallic support H, which is carried by a shaft J. This shaft is delicately mounted in jewel-bearings, as is usual in the construction of such instruments.

B is a damper consisting, preferably, of a solid ring of metal of high conductivity surrounding or threaded upon the ring-pole P, as shown in Fig. 1. It is attached to the supporting-piece H, which is prolonged at right angles to the shaft for the purpose and is placed diametrically opposite the coil A.

D is a flat spiral spring, made, preferably, of phosphor-bronze, attached at its inner end to the shaft J through an insulated collet $d$ and at its outer end to the post F, which is insulated from the base W. C is a similar spring attached to the shaft J by means of the collet $e$, which may be insulated or not, as desired, and to the circumferentially-adjustable arm E, which may also be insulated, if desired.

One terminal of the coil A is electrically connected through the conductor 3 and the spring C to the conductor 1, which leads to one of the binding-posts of the instrument, and the other terminal of the coil is connected through the conductor 4 and the spring D to the conductor 2, which leads to the other binding-post.

I is a pointer, preferably made of aluminium, which is attached to the supporting-piece H, which is carried up and bent at right angles for the purpose. A suitable scale (not shown in the drawings) is provided for indicating the deflections of the pointer, as is usual in the construction of such instruments.

The construction and arrangement of the magnetic field which I have described has important advantages for use in such instruments over any other form with which I am acquainted. By making the polar extensions over which the coil and damper move in the form of substantially continuous rings confronting each other the angular movement of the coil with uniformity of scale is made very large. I have found in practice that this range may be made two hundred and seventy degrees or more.

The arrangement of the points of attachment of the two rings to the magnet-poles proper at points diametrically opposite to each other permits the damper to be mounted on the supporting-shaft diametrically opposite to the coil, and with this arrangement of the parts the damper may be made to exactly balance the coil and pointer without the use of any other balancing-weight. This is an important advantage, since it lightens to a very considerable degree the moving parts.

It is not necessary in order to secure large angular movement of the coil with uniformity of scale that the points of attachment of the two rings should be opposite each other, but I prefer this arrangement for the reason above stated.

It is obvious that in place of the two magnets connected as shown, so as to form consequent poles, a single permanent magnet may be used.

Each one of the annular pole-pieces is made of two parts detachable from each other for the purpose of permitting the coil and damper to be threaded upon them in the construction of the instrument. I have found the construction of these parts shown in Fig. 3 to be very convenient and effective for this purpose, since the parts are of such shape that they can be made to fit each other very accurately by the use of ordinary tools, so that when placed together they form a substantially continuous piece; but the advantages of my invention may be secured to a considerable extent with various other forms of these parts. In Fig. 4, for example, I have shown a form of the pole-pieces in which the polar extensions consist, respectively, of single pieces $p^3$ $q^3$, having ring extensions P' Q', each of which is cut away on one side of its support to a sufficient extent to allow the coil or the damper to be threaded upon it, as is indicated at O. These two incomplete rings are preferably supported at diametrically opposite points, and this construction permits the coil and damper to be placed diametrically opposite each other, as in the first form described. It has the disadvantage of not giving so wide a range of angular deflection with uniform scale, but this disadvantage may be overcome by inserting properly-shaped pieces of magnetic material in the openings in the rings after the coil and the damper are put on.

The magnetic shield M is not essential in all cases, since a fair degree of uniformity of scale may be secured without it. I, however, prefer to use it because of the facility it affords for adjusting the instrument with great accuracy to a predetermined uniform scale. When the shield is not used, any lack of uniformity in the field may be corrected to a very considerable extent by cutting away one or the other of the rings on its inner face or by throwing the annular pole slightly out of parallelism with each other.

For some uses I employ two coils, one of which occupies the position of the damper B, and in this case each of the shells or supports on which the coils are wound is made of highly-conducting material and of sufficient size to serve as a damper.

I claim as my invention—

1. In an electrical measuring instrument, a permanent magnet constituting the field-magnet of the instrument and provided with a pair of polar extensions, each in the form of a ring, said rings being placed side by side, parallel to each other and separated by an air-gap, substantially as described.

2. In an electrical measuring instrument, the combination of a field-magnet consisting of a permanent magnet having polar extensions in the form of rings placed side by side, parallel to each other and separated by an air-gap, with a coil for carrying the current to be measured, threaded upon one of the said polar rings and mounted mechanically so as to be movable circumferentially upon the same, substantially as described.

3. In an electrical measuring instrument, the combination of a field-magnet consisting of a permanent magnet having polar extensions in the form of rings placed side by side, parallel to each other and separated by an air-gap, of a coil for carrying the current to be measured, threaded upon one of the said rings and a damper threaded upon the other of the said rings, the said coil and damper being carried by a common mechanical support in such manner that they are movable circumferentially on said rings, substantially as described.

4. In an electrical measuring instrument, a field-magnet consisting of a permanent magnet having polar extensions in the form of rings placed side by side and parallel to each other and separated by an air-gap, the point of attachment of one of the said polar extensions to the magnet being diametrically opposite to the point of attachment of the other, substantially as described.

5. In an electrical measuring instrument, the combination of a field-magnet consisting of a permanent magnet having annular pole-pieces extending toward each other from opposite directions and overlapping so as to be concentric, parallel to each other and separated by an air-gap, with a coil for carrying the current to be measured threaded upon one of the said annular pole-pieces, and mounted mechanically so as to be movable circumferentially upon the same, substantially as described.

6. In an electrical measuring instrument, the combination of a field-magnet consisting of a permanent magnet having annular pole-pieces extending toward each other from opposite directions and overlapping so as to be concentric, parallel to each other and separated by an air-gap, with a coil for carrying the current to be measured threaded upon one of the said annular pole-pieces, a damper threaded upon the other of said pole-pieces and placed diametrically opposite to the coil, and a common mechanical support carrying the coil and the damper in such manner that they are movable circumferentially upon the said pole-pieces, substantially as described.

7. In an electrical measuring instrument, a field-magnet consisting of a permanent magnet having annular polar extensions placed side by side, parallel to each other and separated by an air-gap, each of said rings being composed of two or more parts of magnetic material separable from each other, substantially as described.

8. In an electrical measuring instrument, a field-magnet consisting of a permanent magnet having annular polar extensions placed side by side, parallel to each other and separated by an air-gap, each of the said polar extensions being constructed of two parts in the form of bars terminating in semicircles detachable from each other, substantially as described.

9. In an electrical measuring instrument, the combination of a field-magnet consisting of a permanent magnet having annular polar extensions placed parallel to each other and separated by an air-gap, of a magnetic shield substantially surrounding the annular polar extensions, but sufficiently separated from the magnet to avoid short-circuiting the field to an injurious extent, substantially as described.

10. In an electrical measuring instrument, the combination of a field-magnet consisting of a permanent magnet having annular polar extensions placed parallel to each other and separated by an air-gap, of a magnetic shield substantially surrounding the annular polar extensions but sufficiently separated from the magnet to avoid short-circuiting the field to an injurious extent and adjustable with respect to the annular extensions, substantially as described.

11. In an electrical measuring instrument, the combination with an annular field, of a coil for carrying the current to be measured, a damper placed diametrically opposite the coil, a pointer, and a mechanical support for the coil, the damper and the pointer being so arranged as to permit of circumferential movement of the parts about the annular field, substantially as described.

12. In an electrical measuring instrument, the combination with an annular field, of a coil for carrying the current to be measured, a damper and a pointer, the coil, damper and pointer being balanced on a common supporting-shaft, substantially as described.

13. In an electrical measuring instrument, the combination of a field-magnet having annular pole-pieces extending in opposite directions from its poles and overlapping so as to be concentric, parallel to each other and separated by an air-gap, of a coil for carrying the current to be measured threaded upon one of the pole-pieces, a damper placed diametrically opposite the coil and threaded upon the other pole-piece, a common supporting-shaft for the coil and the damper so arranged that the coil and the damper are movable circumferentially upon their respective pole-pieces, and a magnetic shield substantially surrounding the pole-pieces, but sufficiently separated from the field-magnet to avoid injurious short-circuiting of the field and adjustable with respect to the pole-pieces, substantially as described.

14. An electrical measuring instrument comprising a permanent magnet having polar extensions and a magnetic shield partially surrounding said extensions for equalizing the distribution of the magnetic field.

15. An electrical measuring instrument comprising a permanent magnet having polar extensions and a magnetic shield partially surrounding said extensions for equalizing the distribution of the magnetic field and means for adjusting said shield with reference to the polar extensions.

In testimony whereof I have hereunto subscribed my name this 6th day of January, 1897.

OLIVER B. SHALLENBERGER.

Witnesses:
LEONARD E. CURTIS,
MATTHEW KENNEDY.